United States Patent [19]
Smith et al.

[11] Patent Number: 6,104,935
[45] Date of Patent: Aug. 15, 2000

[54] DOWN LINK BEAM FORMING ARCHITECTURE FOR HEAVILY OVERLAPPED BEAM CONFIGURATION

[75] Inventors: Martin Stevens Smith, Chelmsford; Andrew William Jeffries, Saffron Walden; Christopher Robert Ward, Bishop's Stortford, all of United Kingdom

[73] Assignee: Nortel Networks Corporation, Montreal, Canada

[21] Appl. No.: 08/851,164

[22] Filed: May 5, 1997

[51] Int. Cl.⁷ ........................................ H04B 7/00
[52] U.S. Cl. ............................. 455/562; 455/561
[58] Field of Search ................... 455/25, 13.3, 63, 455/561, 562; 342/373, 174, 354, 368, 359, 350

[56] References Cited

U.S. PATENT DOCUMENTS

| | | | |
|---|---|---|---|
| 4,704,734 | 11/1987 | Menich et al. | 455/562 |
| 4,806,938 | 2/1989 | Meadows | 342/370 |
| 4,872,015 | 10/1989 | Rosen | 455/13.3 |
| 4,901,085 | 2/1990 | Spring et al. | 342/373 |
| 4,907,004 | 3/1990 | Zacharatos et al. | 342/373 |
| 4,924,235 | 5/1990 | Fujisaka | 342/374 |
| 5,233,358 | 8/1993 | Murphy | 342/375 |
| 5,274,844 | 12/1993 | Harrison | 455/25 |
| 5,473,333 | 12/1995 | Chiba | 342/378 |
| 5,548,813 | 8/1996 | Charas et al. | 455/562 |
| 5,594,941 | 1/1997 | Dent | 455/20 |
| 5,784,030 | 7/1998 | Lane et al. | 342/373 |

FOREIGN PATENT DOCUMENTS

| | | | |
|---|---|---|---|
| 0639035A1 | 2/1995 | European Pat. Off. | H04Q 7/36 |
| 0 593 822 | 4/1995 | European Pat. Off. . | |
| 0 647 978 | 4/1995 | European Pat. Off. . | |
| 0786826A2 | 7/1997 | European Pat. Off. | H01Q 25/00 |
| 2 690 010 | 10/1993 | France . | |
| 2-141033 | 5/1990 | Japan . | |
| 2 178 903 | 2/1987 | United Kingdom . | |
| 2 280 010 | 1/1995 | United Kingdom . | |
| 2 281 011 | 2/1995 | United Kingdom . | |
| 2 286 749 | 8/1995 | United Kingdom . | |
| 2 320 618 | 6/1998 | United Kingdom . | |
| WO9534102 | 12/1995 | WIPO | H01Q 1/38 |
| WO9700543 | 1/1997 | WIPO | H01Q 25/00 |
| WO97/23017 | 6/1997 | WIPO | H01Q 3/40 |

OTHER PUBLICATIONS

Swales, "A Spectrum Efficient Cellular Base—Station Antenna Architecture", Personal and Mobile Communications Conference, Warwick, UK, 1991, pp. 272–279.

Davis, "Proposed Advanced Base Station Antennas For Future Cellular Mobile Radio Systems", Australian Telecoms Research, vol. 22, No. 1, 1998, pp. 53–60.

Smieth, "Introduction to Antennas", Mae Millan 1988, Chapter 6 (pp. 89–113).

A Spectrum Efficient Cellular Base–Station Antenna Architecture.

Proposed Advanced Base Station Antennas for Future Cellular Mobile Radio Systems.

Introduction to Antennas pp 89–107.

*Primary Examiner*—Salvatore Cangialosi
*Attorney, Agent, or Firm*—Lee, Mann, Smith, McWilliams, Sweeney & Ohlson

[57] ABSTRACT

An antenna beam forming for generating a plurality of broad overlapping radiation beams for a cellular radio application comprises an antenna array having a plurality of individual antenna elements, each individual antenna element connected by a cable to a respective diplexor, each diplexor fed by a multi-channel power amplifier receiving an input from an output port of an eight way Butler matrix. Transmission signals are input to seven input ports of the Butler matrix, and output transmission signals are produced at four of the output ports of the Butler matrix. A remaining four output ports are each terminated with a respective matched load. A 3 dB power loss incurred in the Butler matrix is compensated by provision of a plurality of pre-amplifiers prior to the input ports of the Butler matrix, with the power amplification stage being carried out on the outputs of the Butler matrix. Side lobe suppression is maintained by ensuring phase and amplitude integrity across the output channels. A set of phase and amplitude adjusters operate on the output transmission signals from the Butler matrix output ports. The phase and amplitude adjusters may be electronically controlled.

32 Claims, 12 Drawing Sheets

DOWN LINK BEAM FORMING ARCHITECTURE FOR HEAVILY OVERLAPPED BEAM CONFIGURATION

FIELD OF THE INVENTION

The disclosure relates to an antenna configuration for forming a plurality of overlapping radiation beams at a base station for use in a cellular radio communications system, and a method of forming a plurality of overlapping radiation beams

BACKGROUND OF THE INVENTION

Cellular radio systems are currently in widespread use throughout the world providing telecommunications to mobile users. In order to meet the demand for transmission capacity within an available frequency band allocation, cellular radio systems divide a geographic area to be covered into a plurality of cell areas. Within each cell is positioned a base station with which a plurality of mobile stations within the cell communicate.

In general, an object of cellular radio communication system design is to have as few base stations as possible, since base stations are expensive, and require extensive effort in obtaining planning permission, and in some areas, suitable base station sites may not be available. In order to have as few base stations as possible, each base station ideally has as large a capacity as possible in order to service as large a number of mobile stations as possible. However, there are fundamental limits on the maximum user capacity of a base station for serving mobile stations because the number of mobile stations which can be served by a base station depend upon the available number of carrier frequencies, and these carrier frequencies are a limited resource in the frequency spectrum. In order to physically separate radiations at the same or closely matching frequencies, it is known to make use of directional antennas which produce directional radiation beams. The use of directional radiation beams allows greater reuse of carrier frequencies, and increases system capacity compared with omni-directional antennas or conventional sectorial antennas. Where carrier frequencies are reused between cells, the distance between cells in which a same carrier frequency is reused is planned such that co-channel interference is maintained at a tolerable level.

The type of antenna used at the base station site can potentially make significant improvements to the range and capacity of a cellular radio system. The conventional approach is to use omni-directional antennas, tri-sectored antennas or hex-sectored antennas. However, in another known approach, a base station antenna pattern comprises a beam of narrow angular widths as shown in FIGS. 1 and 2 herein. A narrow radiation beam 1 is directed by a base station Smart antenna 2 at a desired mobile station 3. The beam is narrow in both an azimuth and elevation planes, and tracks the mobile's movements. When compared to an omni-directional antenna, such a narrow beam has dual benefits of having high gain, leading to increased range in a thermal noise limited environment, and of rejecting interference from co-channel reuse cells, due to spatial separation of beams, thereby allowing higher capacity in a cell without cell splitting. A narrow beam has an advantage of reducing interference in a balanced manner on an uplink and a downlink path. On the downlink the mobile is unlikely to fall in the beams of other base station transmitters operating co-frequency re-use.

Where each cell has a number of antennas providing narrow beams which track individual mobiles, there results an overall improvement in carrier to interference (C/l) ratio due to the statistical probability that different beams re-using the same carrier frequency will be pointing in different directions, having different azimuths. The likelihood of two or more beams having a same carrier frequency intercepting each other is diminished. The narrower the beams, the lower the probability that a mobile will intercept a same frequency beam of a different cell in which the carrier frequency is re-used.

The extent of the advantage of a narrow beam antenna over an omni-directional antenna is a function of the beam width of the narrow beam antenna. The narrower the beam width, the greater the advantage. However, narrow beam antennas have increased size and complexity compared with omni-directional or tri-sectored antennas. For the purposes of this document, the use of the word "omni-directional" is intended to convey the meaning of having radiation coverage over an area corresponding to substantially the whole geographic area of a cell. Although a narrow radiation beam is formed at radio frequencies typically in the 900 MHz, 1800 MHz or 1900 MHz bands, a narrow beam can usefully be visualized as analogous to search light beams which emanate from the base station, and track the mobiles. When contrasted with an omni-directional antenna, this creates a high quality transmission path with minimal interference.

Prior art literature recognizes many of the potential benefits of narrow beam antennas[1,2]. The use of directional antennas in current cellular radio systems is based upon the principle of sectorization, as illustrated in FIG. 3 herein which illustrates schematically an area covered by a cell pattern in which a plurality of nominally hexagonal cells in an N=7 cluster size hexagonal pattern are each divided into three sectors, each spanning a range of 120° azimuth. The main source of interference in a cellular system comes from the so called first tier reuse cells 300–305, which in the example of FIG. 3 are spaced apart from a center cell 306 by a distance of at least two intermediate cells, for example cells 307, 308. Using omni-directional antennas, the base station antenna in center cell 306 receives interference from mobile stations in all cells up to and including cells 300–305. However, if an antenna has a nominal 120° beam width corresponding to a cell sectorized into three sectors (a tri-sectorized configuration) interference is received from mobile stations in only two first tier re-use cells, 303, 304. The situation can be improved by using an antenna with a 60° beam width, corresponding to a hex-sectored configuration, in which case interference is received from mobiles in only one of the first tier cells. In sectorized cells, cellular radio transceivers at the base station are only connected to one sector or antenna and cannot be used in other sectors within the same cell.

Whilst provision of a relatively large number of narrow beams may help increase system capacity, the advantages provided by narrow beams are due in part to the use of smart antennas which allow steering of the beams. However, the applicants have noted that in the case of the North American Digital-AMPS cellular radio system the beams must remain spatially fixed. The reason for this is as follows:

The conventional North American digital AMPS cellular radio system comprises an analogue mobile standard, which also has provision for a digital time division multiple access (TDMA) mobile telephony standard compatible with the analogue mobile standard. The North American digital AMPS is also referred to as International Standard IS-54, which is an analogue/digital dual mode standard operating at 850 MHz band and more recently superseded by International Standard IS-136 dual mode analogue/digital mobile standard encompassing operation at 850 MHz band and 1900 MHz band. The D-AMPS standard includes a constraint on the downlink which precludes the use of using individually steered beams for each subscriber mobile station.

In the D-AMPS standard, a set of frequency slots each 30 kHz wide are provided, each of which can be used as an analogue channel, or as a time division multiple access digital channel. In the part of the D-AMPS standard relating to digital operation, each carrier frequency at the center of a respective 30 kHz frequency band, is used to carry a plurality of time division multiple access digital channels. Currently, operators divide each carrier frequency into three digital channels on a TDMA basis. This gives three time slots per digital frame, which has a duration of around 20 ms as illustrated in FIG. 4 herein. The D-AMPS standard specifies that whenever any one carrier has a time slot in use, i. e. a single channel to a single subscriber mobile station, then the radiation beam comprising that carrier frequency must be maintained to the subscriber mobile during not only the time slot carrying the channel communicating with that mobile subscriber, but also for the duration of the other time slots in the same frame. As soon as a carrier frequency is assigned to one subscriber digital mobile, the radiation beam cannot be moved off that mobile for other time slots within the same frame. This precludes the use of beam shifting between mobiles on a time slot by time slot basis because the subscriber mobile apparatus operating in D-AMPS receives a 20 bit synchronization sequence during its own time slot in the frame, and additionally may also look in the 20 bit synchronization sequence of preceding and succeeding time slots. Referring to FIG. 5 herein, operation of the D-AMPS handset is illustrated with reference to three time slots, representing three different channels in a D-AMPS transmission. A subscriber mobile handset allocated to a second time slot 500 within digital frame 501 inspects a synchronization training sequence 502 within its own time slot 500, as well as receiving synchronization sequences 503, 504 of respective corresponding time slots 505, 506 corresponding to other channels in the digital frame. Thus, if the other time slots 505, 506 in the digital frame 501 are effectively removed from the subscriber mobile by moving the radiation beam away from the subscriber mobile during those other time slots, the mobile cannot read the synchronization sequences in those other time slots and would experience degraded performance.

Thus, in the D-AMPS system, the statistical advantage provided by the technique of beam steering of a large number of narrow beams using smart antennas is not available and it is not possible to devise a scheme which allows beams to be dynamically moved from one mobile direction to another from one time slot to the next. Therefore, a downlink beam former for D-AMPS has to use a fixed beam approach, where the optimum beam is selected by uplink measurements of signal quality.

As a solution to increasing the capacity of the D-AMPS cellular radio system, the inventors have proposed the use of a sector covered by a plurality of non-orthogonal overlapping beams which are spatially fixed. This proposal has the advantage of increasing the number of directional beams in a sector, thereby allowing an increase in the frequency reuse, and consequent increase in capacity whilst minimizing the need for hand-over between beams which would be otherwise incurred with an equivalent number of orthogonal[3] narrow overlapping beams. However, the task of producing a set of non-orthogonal overlapping beams introduces its own problems in terms of how to achieve such a set of beams from a relatively small antenna aperture, and how to generate the beams in a power efficient manner, as will become apparent from the following detailed description of the best mode herein.

In this specification, the term orthogonal, when used in relation to beams is to be construed as having a meaning as indicated in the prior art, as exemplified in "Introduction to Antennas" by Martin S Smith[3], chapter 6, and the term non-orthogonal is to be construed accordingly.

SUMMARY OF THE INVENTION

One object of the present invention is to increase system capacity in a cellular radio system, in terms of number of mobile station users per base station, whilst maintaining an acceptable carrier to interference ratio in a cellular mobile communications system.

Another object of the present invention is to overcome a problem of maintaining low insertion losses in introducing multiple overlapping beams capacity to an antenna arrangement.

According to a first aspect of the present invention there is provided an antenna arrangement for a cellular wireless communications system, said arrangement comprising:

an antenna array capable of forming a multiplicity of separate overlapping radio frequency radiation beams;

a beam forming means producing a beam formed output signal; and a plurality of power amplifiers positioned between said beam forming means and said antenna array, each said power amplifier receiving an input from said beam forming means.

Thus, any insertion loss incurred by the beam forming means may be incurred on transmission signals prior to their power amplification.

Preferably said antenna array comprises a plurality of individual radiating antenna elements. The antenna elements are phase and amplitude driven to produce a plurality of non-orthogonal radiating beams. Use of a multi-element array may provide a relatively small aperture size for production of the beams. A small aperture size is advantageous from the point of view of an improved visual impact and lower windage effects.

One reason why the present embodiment and methods of the best mode herein are preferred to conventional sectored antennas is because the space required for a single multi-element antenna at the mast head is less that for a plurality of sector antennas.

Preferably a separate said power amplifier is provided per each antenna element of said antenna array. An advantage of this arrangement is that only one power amplifier is required per antenna element, rather than one power amplifier per beam. This allows the use of multiple overlapping beams to avoid the problems of cusping loss without requiring any corresponding increase in the number of power amplifiers.

Preferably said power amplifiers comprise multi-channel power amplifiers.

Preferably said antenna arrangement further comprises a plurality of phase calibration means arranged for phase calibration of signals at a position between said beam forming means and said antenna array.

Said antenna arrangement may comprise automated adjustment means for automatically controlling said phase calibration means to allow transmitted signals from each antenna element to be sampled.

Preferably said antenna arrangement further comprises a plurality of amplitude calibration means arranged for amplitude calibration of signals at a position between said beam forming means and said antenna array.

Said antenna arrangement may comprise automated adjustment means for automatically controlling said amplitude calibration means. Such an automated adjustment means may include one or more near field probes, to allow transmitted signals from each antenna element to be sampled.

Preferably said antenna arrangement is operable to produce a plurality of non-orthogonal overlapping beams. Such beams may exhibit arbitrary overlap and typically have beamwidths of at least 20° to 30° (measured at conventional −3 dB points on the gain pattern).

Preferably said beam forming means comprises a Matrix having a first plurality of signal input ports and a second plurality of signal output ports, wherein a number of said output ports feeding signals to said power amplifiers is less than a number of said input ports.

Said beam forming means, said antenna array; said plurality of radio frequency transceivers; said beam forming means; and said plurality of power amplifiers may be selected such as to give a root mean square phase variation across said antenna array of within 20 degrees, and suitably within 10 degrees (at any given rf carrier frequency and operating temperature).

Said beam forming means, said antenna array; said plurality of radio frequency transceivers; said beam forming matrix; and said plurality of power amplifiers may be selected such as to obtain and amplitude variation of signals across said antenna array of within 3 dB, and suitably within 1.5 dB (at any given rf carrier frequency and operating temperature).

According to a second aspect of the present invention there is provided a method of forming a multiplicity of overlapping beams using a multi-element antenna array, said method comprising the steps of:

inputting a first plurality of transmission signals into a beam forming means;

outputting a second plurality of transmission signals from said beam forming means;

inputting said second plurality of transmission signals to a plurality of power amplifiers;

amplifying said second plurality of transmission signals to produce a plurality of power amplified transmission signals; and energizing said antenna array with said power amplified transmission signals to produce said multiplicity of overlapping beams.

The beams are suitably heavily overlapped, being non-orthogonal. Suitably the beams are overlapped closely enough to each other to provide a cusping loss of around 1 dB or less, but the method is applicable to formation of beams having a cusping loss in the range 4 dB to substantially 0 dB.

Preferably the method comprises the step of controlling a respective phase of each of said second plurality of transmission signals prior to said step of amplification.

Preferably the method comprises the step of controlling a respective amplitude of each of said second plurality of transmission signals prior to said step of amplification.

Preferably said beams are spatially fixed beams.

Preferably each said antenna element receives a power amplified transmission signal of a corresponding respective said power amplifier.

Preferably each of said second plurality of transmission signals comprises a plurality of individual communications channels.

According to a third aspect of the present invention there is provided a beam forming apparatus for a cellular wireless communications system, said apparatus comprising:

an antenna array comprising a plurality of antenna elements;

a beam forming matrix having a first plurality of input ports each receiving a corresponding respective input transmission signal, a second plurality of output ports each outputting a corresponding respective output transmission signal; and a plurality of power amplifiers feeding said input transmission signals into said input ports, wherein each said power amplifier feeds a corresponding respective said input port, and each said output ports feeds a corresponding antenna element, there being one said power amplifier per each said input port and one antenna element per each said output port, and said first plurality is greater than said second plurality.

According to a fourth aspect of the present invention there is provided in a cellular wireless communications apparatus, a method of communicating with a mobile station, said method comprising the steps of:

forming a plurality of directional uplink beams, said uplink beams distinguishable from each other in azimuth;

forming a plurality of directional downlink beams, said downlink beams distinguishable from each other in azimuth, wherein a said downlink beam occupies an in-fill region in azimuth between adjacent first and second said uplink beams;

receiving from said mobile station first and second mobile signals on said respective first and second said uplink beams;

analyzing said first and second mobile signals received on said first and second uplink beams; and depending on a result of said analysis, communicating with said mobile station on said downlink beam occupying said in-fill region.

Preferably said step of analyzing comprises comparing a strength of said first mobile signal with a strength of said second mobile signal.

Said plurality of uplink beams may comprise orthogonal beams. Said plurality of downlink beams may comprise non-orthogonal beams. Preferably individual ones of said plurality of downlink beams occupy in-fill regions between adjacent ones of said plurality of uplink beams. Preferably individual ones of said plurality of downlink beams overlap spatially regions occupied by individual ones of said uplink beams.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

The best mode described herein may have particular application in addressing aspects of operation peculiar to the conventional North American digital-AMPS (D-AMPS) cellular radio system, although the invention is not restricted to digital-AMPS systems, but is applicable to GSM, PCS 1900, code division multiple access (CDMA) and other cellular radio systems, and is limited only by the features included in the claims herein.

In the best mode described herein, a plurality of broadly overlapping non-orthogonal dowlink radiation beams are formed radiating over a sector of a cell region. The number of beams per sector, eg 120° sector is variable, and it is envisaged that the optimum number of beams per 120° sector will be in the range three to seven beams per 120° sector. The following examples describe an embodiment which forms a seven downlink beam and four uplink beam embodiment.

Figure 6:
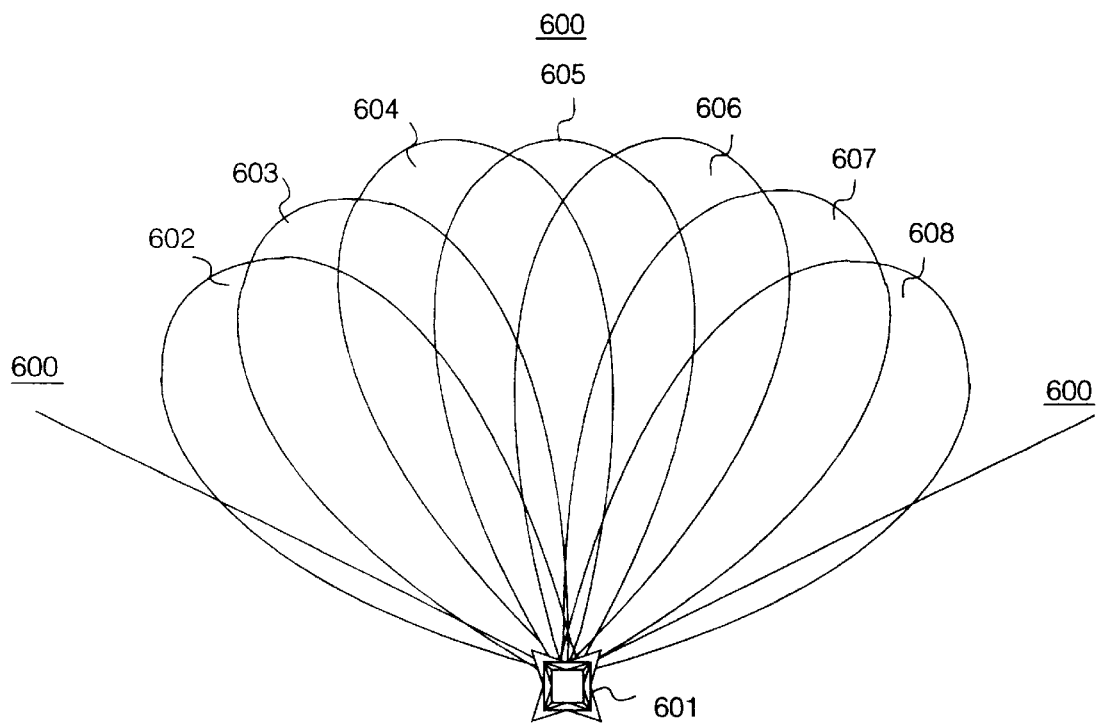
FIG. 6 illustrates schematically a plurality of downlink radiation beams radiating from an antenna base station in plan view the beams formed by a beam forming apparatus according to a specific embodiment of the present invention.
Figure 7:
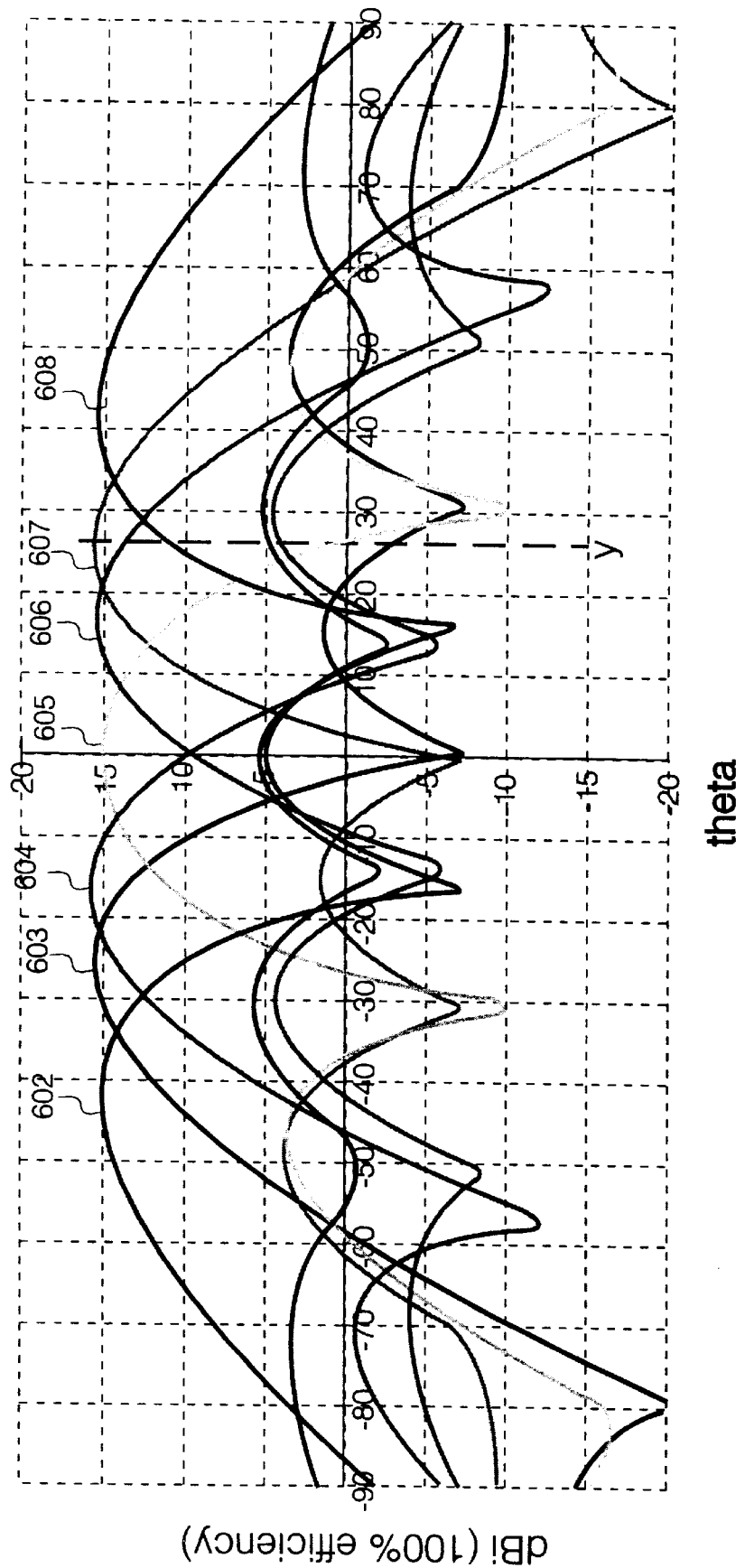
FIG. 7 illustrates an azimuth plot of the measured radiation beams of FIG. 6.

Referring to FIG. 6 herein, there is illustrated one example of a downlink radiation beam forming pattern according to a specific method of the present invention. The radiation pattern is generated by an array of antenna elements. A 120° sector 600 around an antenna base station 601 is occupied by first to seventh radiation beams 602–608 respectively, the carrier frequencies sufficiently spaced apart as to be non interfering with each other. In the case of D-AMPS, the beams each operate at a different frequency, but in a general case, do not need to be different. Each beam extends over an arc of at least 17° at its nominal −1 dB contour, and the seven beams overlap each other significantly in the 120° sector. Adjacent beams overlap each other and cusp at their nominal −1 dB contours, and next but one adjacent beams overlap and cusp with each other at their nominal −4 dB contours. The degree of overlap is more conveniently seen by representing the beams as a plot of azimuth angle against power as shown in FIG. 7 herein. In order to achieve adequate carrier to interference performance, side lobes of the radiation beams must be kept at below −10 dB from the peak main beam power. Also shown are side lobes for each respective radiation beam 602–608, which are kept at a level of −10 dB or lower, compared to the peak main beam power. For IS-54/IS-136 applications, the standards dictate that on the downlink, the base station must maintain a constant level transmission during the full duration of the frame on any particular bearer channel whenever at least one mobile has been assigned to that bearer. This means that it is not possible to devise a scheme which allows beams to be dynamically moved from one mobile direction to another from one time slot to the next. Thus, a downlink beam format for D-AMPS has to use a fixed beam approach. The optimum beam may be selected by uplink measurements of signal quality. In FIG. 6, the direction of the downlink main beams are fixed, and smart processing is used to select an appropriate beam directed towards a subscriber mobile station. The traffic capacity and carrier to interference ratio performance of a D-AMPS system are improved using the broad interleaved beam pattern of FIGS. 6 and 7 as follows.

Because of the constraints of IS-54 and IS-136, the more sectorized that the radiation beams are made, the higher the management overhead becomes in maintaining a channel with a moving mobile station. As an example, if there are T trunks to be assigned to K carrier frequencies (each carrier frequency comprising a different radiation beam) then there can be assigned T/K trunks per carrier. At a given blocking rate per carrier, there can be calculated how many Erlangs that carrier supports. The total number of Erlangs per 120° sector is:

K×the number of Erlangs per carrier.

This calculated figure works out to be much less than for a system in which any of the T trunks are allowed to be floated anywhere across the 120° sector. Typically with TDMA, there are 32 carriers per 120° sector, each carrier supporting 3 channels (3 subscriber mobiles. ) Thus, there are 96 time slots available per 120° sector. Some of those time slots need to be allocated for broadcast control. If all the time slots could be floated anywhere across the 120° sector, then 84 Erlangs of capacity could be provided within that sector.

However, using an example of four "narrow" beams per 120° sector where the radiation beams overlap at a cusp point of −4 dB, if the time slots are restricted to being sectorized over four beams in the 120° sector, then the trunking inefficiency for a four beam solution could give rise to a 120° sector capacity as low as 63 Erlangs.

Figure 1:
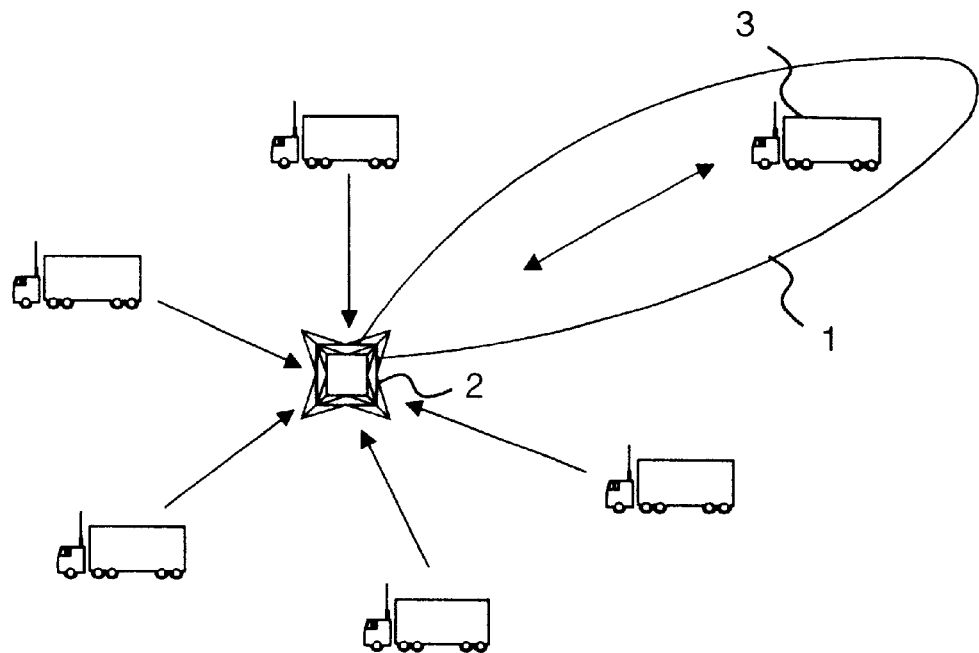
FIG. 1 illustrates a base station antenna pattern comprising a beam of narrow angular widths.
Figure 2:
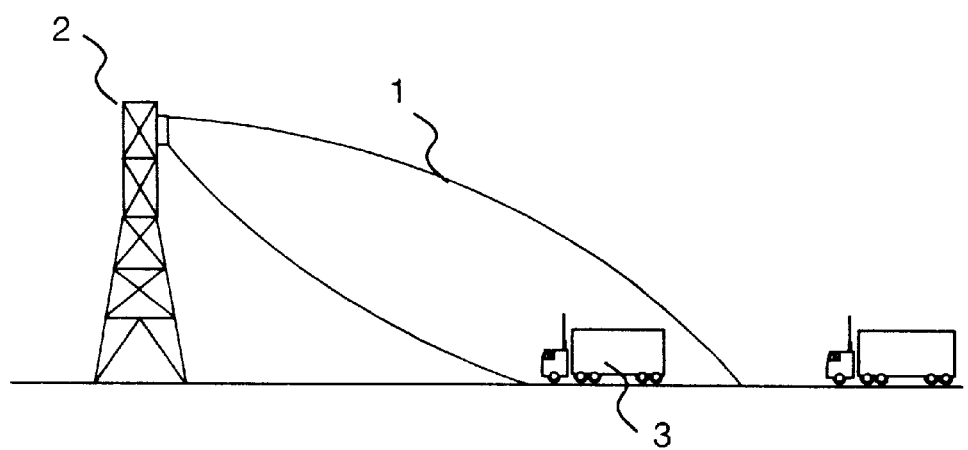
FIG. 2 is an enlarged elevational illustration of the base station antenna pattern illustrated in FIG. 1.
Figure 3:
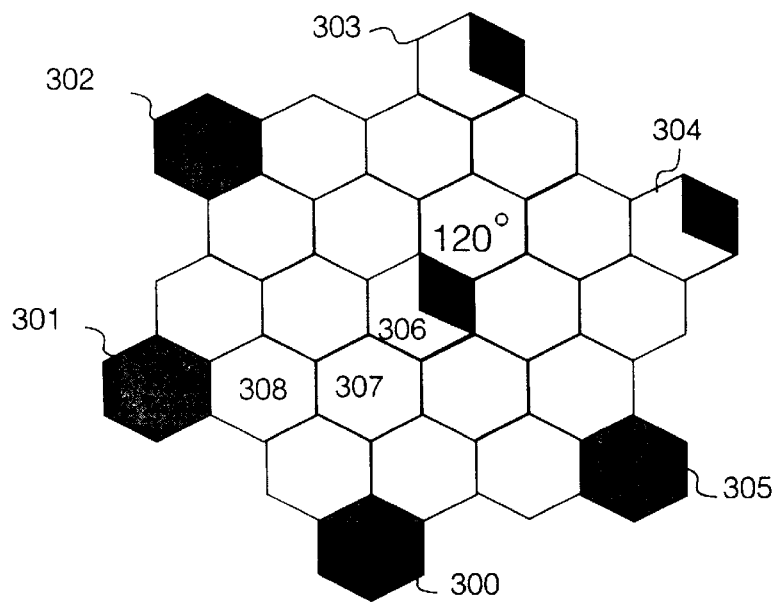
FIG. 3 illustrates the principle of sectorization of directional antennas in current cellular radio systems.
Figure 8:
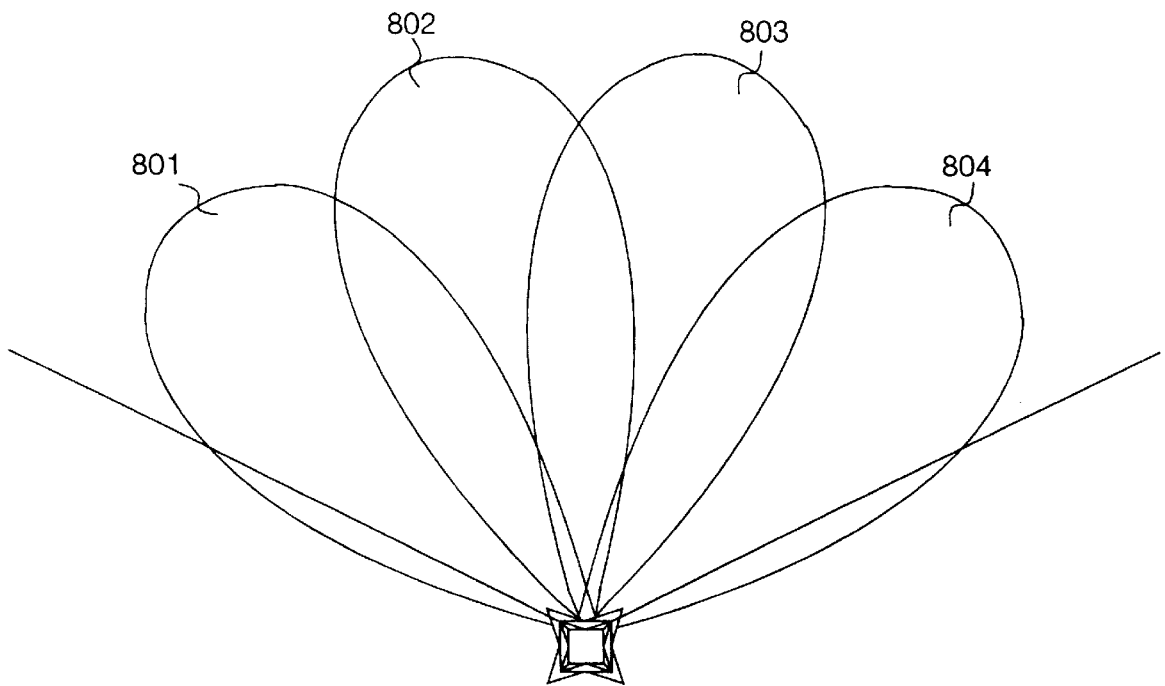
FIG. 8 illustrates an example of four broad interleaved beams occupying a 120° sector.
Figure 4:
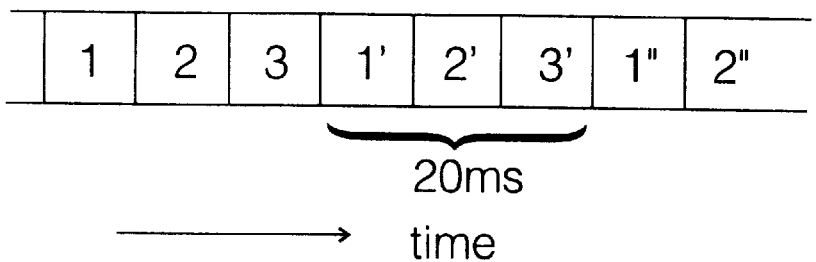
FIG. 4 illustrates how prior art system operators divide each carrier frequency into three digital channels on a TDMA basis.
Figure 5:
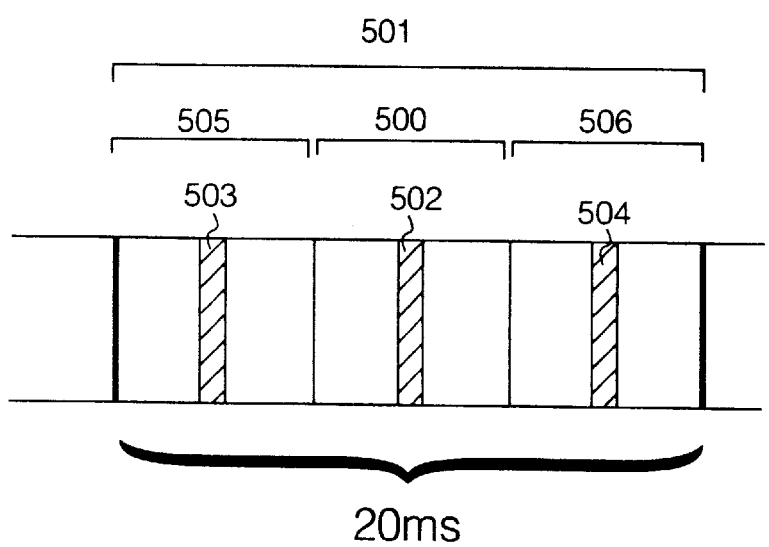
FIG. 5 illustrates the operation of a D-AMPS handset with reference to three time slots.

On the other hand, if, as shown in FIG. 8 herein, for the same four beam solution, the beams are broadened, such as to overlap with each other at a cusp point of −1 dB , then a sector capacity of 75 Erlangs can be achieved, where the beams are allocated to subscriber mobiles using smart antenna techniques. In the case of the four overlapping beams per 120° sector, the beams ideally overlap each other cusping at their −1 dB contours and have a −4 dB beam width extending over an arc of angle of around 50° centered at their radiation sources. The beams are made as broad as possible, consistent with achieving acceptable carrier to interference ratio at the reduce reuse factor. Since the object is to increase capacity, the carrier to interference performance does not need to be greater than the conventional carrier to interference performance of a conventional tri-sectored antenna system operating at a conventional reuse pattern.

The inventors have determined that using broad non-orthogonal, overlapping, fixed directional there are significant advantages in terms of cost per Erlang and in terms of capacity enhancement as compared with prior art systems.

Figure 9:
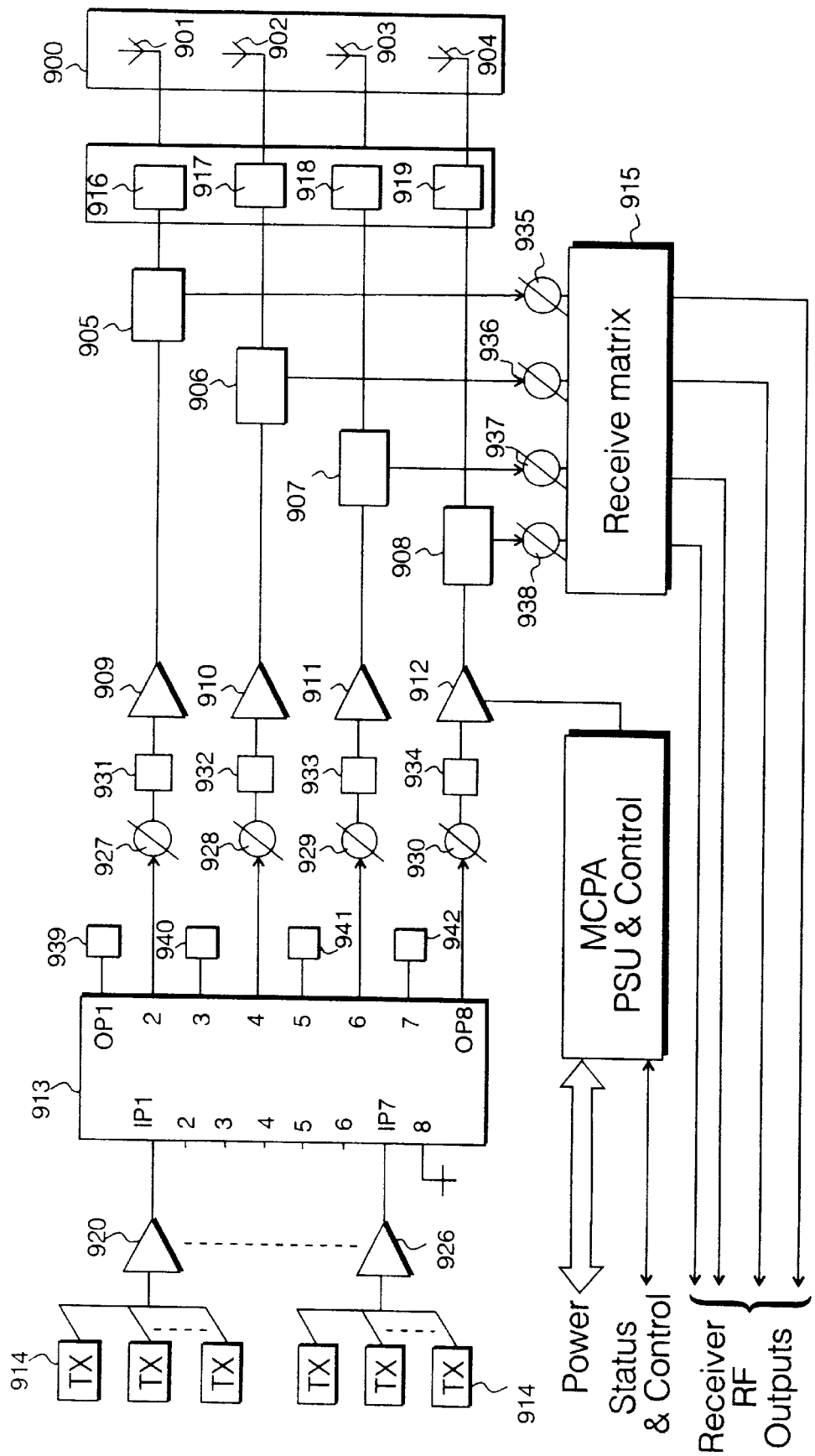
FIG. 9 illustrates a specific embodiment of a beam forming apparatus for carrying out the invention.

A specific embodiment of an antenna arrangement according to the present invention will now be described. The arrangement shown is configured for a D-AMPS application, producing seven downlink beams, although the general architecture shown is capable of producing a plurality of beams, and is not restricted to D-AMPS operation and application. Referring to FIG. 9 herein, there is illustrated schematically an architecture for a beam forming apparatus for cellular radio application. The beam forming apparatus comprises an antenna array 900 comprising a plurality of individual radiating antenna elements, in this case an array of four antenna elements 901–904 the element being physically fixed and each having a wide angular coverage, e.g. 120°, the antenna array connected to a plurality of diplexors 905–908, each diplexor receiving an output signal from a respective multi-channel power amplifier 909–912, the power amplifiers being supplied with transmission signals from a beam forming matrix 913, the beam forming matrix being supplied with signals for transmission from a plurality of transmission signal sources 914; a receiving matrix 915 for receiving incoming signals from the diplexors 905–908; a plurality of RF feeder cables 916–919 positioned between the diplexors and the antenna array for feeding power amplified signals to the antenna elements; a plurality of pre-amplifiers 920–926, for pre-amplifying transmission signals prior to input to the beam forming matrix 913; a plurality of phase adjusters 927–930 positioned between the beam forming matrix and the power amplifiers for adjusting the phase of transmission signals prior to input to the power amplifiers 909–912; a plurality of variable attenuators 931–934 positioned between the beam forming matrix and the power amplifiers for adjusting amplitudes of transmission signals prior to inputting to the power amplifiers; and a second plurality of phase adjusters 935–938 receiving received signals separated by the diplexors 905–908 prior to inputting these to the receiving matrix 915.

The beam forming apparatus shown in FIG. 9 creates at the antenna array 900 a radiation beam pattern comprising a plurality of relatively broad non-orthogonal overlapping beams as described herein with reference to FIGS. 6 and 7.

In the example of FIG. 9, seven transmission signals generated by transmission signal sources 920–926 are fed into seven input ports of the beam forming matrix 913 which produces four output transmission signals at each of four output ports. Each output port feeds a corresponding respective transmission signal to a said phase adjuster and a respective said amplitude adjuster 931–934 prior to inputting the phase/amplitude adjusted transmission signal in to corresponding respective power amplifiers 909–912. Each of the four power amplifiers feeds a corresponding respective radiating antenna element 901–904 to produce the plurality of radiating downlink beams from the four antenna elements.

Effectively in this embodiment, the transceivers are "hard wired" to the corresponding beams and a call is handed over between beams (and hence frequency carrier) as a mobile station moves around.

Figure 10:
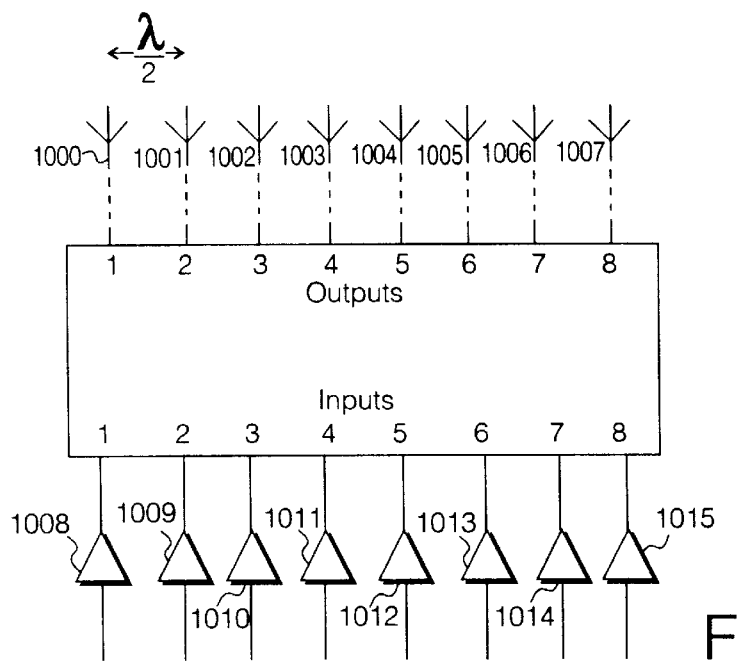
FIG. 10 illustrates a prior art beam forming matrix loss lessly connecting a plurality of power amplified transmission signals to a corresponding plurality of antennas.
Figure 11:
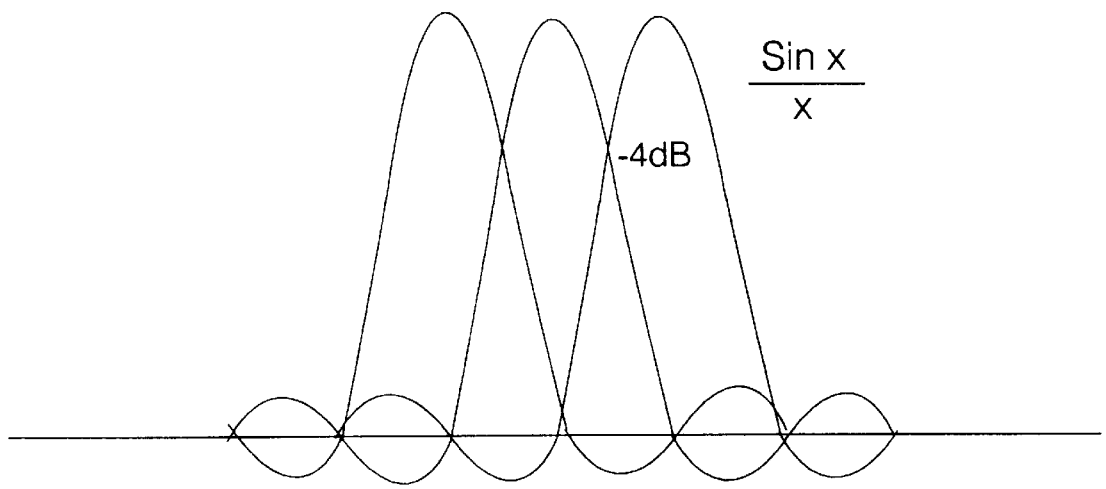
FIG. 11 illustrates a prior art radiation beam pattern produced by the arrangement of FIG. 10.
Figure 12:
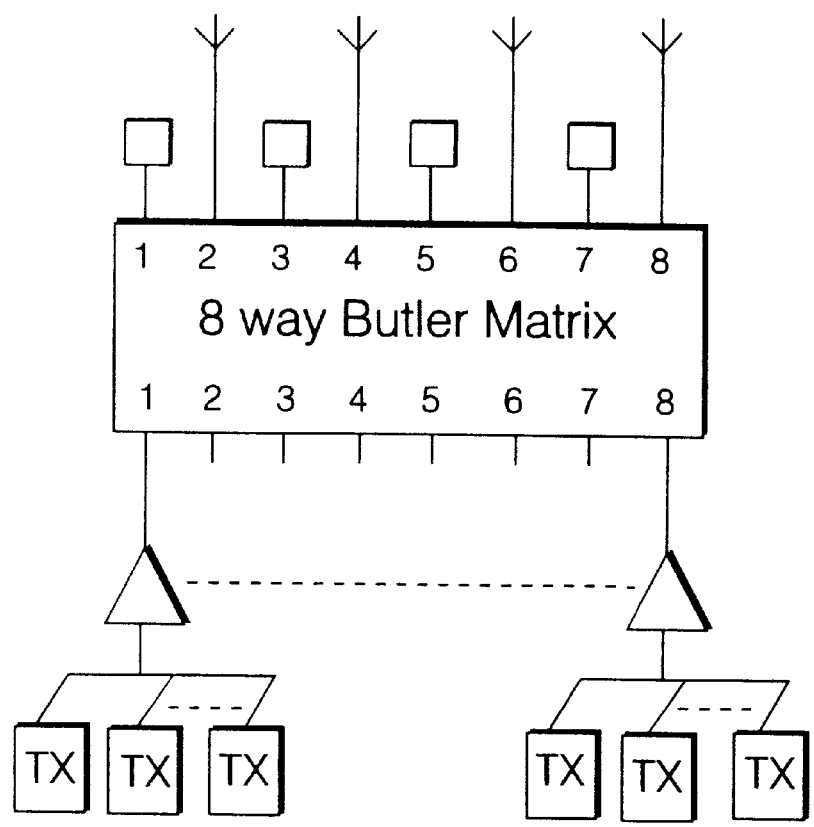
FIG. 12 illustrates another configuration of a beam forming matrix according to another specific embodiment of the present invention, for forming a plurality of broad interleaved beams, the beam forming matrix incurring a high insertion loss.

Typically, the beam forming matrix comprises a conventional 8-way Butler matrix. The Butler matrix has the advantage of being a commercially available product having high efficiency and low cost. The commercially available Anaren 560014×8 Butler matrix has been used successfully in a specific embodiment in the best mode herein, with operating band width of 750 MHz to 950 MHz. In order to produce the overlapping beam pattern, only alternate ones of the eight output ports of the Butler matrix are used to drive the respective corresponding four antenna elements of the antenna array 900. The remaining outputs are terminated with load elements 939–942 respectively. This arrangement of the Butler Matrix incurs an insertion loss problem as follows:

Referring FIG. 10 the 8-way Butler matrix when connected conventionally to provide eight outputs to eight antenna elements 1000–1007 from eight inputs, fed by eight power amplifiers 1008–1007 produces the conventional orthogonal sin X/X beam pattern as shown in FIG. 11 herein, in which adjacent beams overlap at approximately their −4 dB points. In this known configuration, the Butler matrix has an advantage of being theoretically loss-less and there is significant side lobe cancellation between beams. However, a disadvantage of connecting the Butler matrix 913 having eight input ports feeding four output ports to produce the overlapping beam configuration in the best mode herein as shown in FIG. 9, is that the Butler matrix connected in this way incurs a 3 dB power loss. If the inputs of the Butler Matrix were to be connected to the power amplifiers as suggested by the conventional practice, this would result in an arrangement as shown in FIG. 12 herein, which shows an 8-way Butler matrix having eight input ports and eight output ports, and eight multi-channel power amplifiers each feeding an amplified three channel transmission signal to a respective said input port. However, because the antenna array has four antenna elements, each antenna element receiving an output transmission signal from a respective said output port of the Butler matrix, the remaining four output ports of the Butler matrix each being terminated by a corresponding respective matched load the Butler Matrix is no longer loss less, and incurs a 3 dB insertion loss. This is a problem because in a cellular radio base station, the power amplifiers are one of the most important and expensive components. Incurring a 3 dB loss in a beam forming matrix which receives inputs from a plurality of power amplifiers as shown in FIG. 12 herein would therefore pose an unacceptable power loss, since to maintain adequate power levels at the radiation beams, the power amplifiers would need to be up-rated incurring extra cost and extra power dissipation and bulk a station. Further, the arrangement in FIG. 12 requires one multi-channel power amplifier per input port, there being more power amplifiers than antenna elements. Whilst the configuration of FIG. 12 may work to produce heavily overlapped beams, it is not an optimal solution to beam forming.

In the best mode herein, this problem is overcome by providing the preamplifiers 920–926 inputting the transmission signals into the input ports of the beam forming Butler Matrix 913, and using multi-channel power amplifiers to amplify the signal output from the beam forming Butler matrix. The pre-amplifiers compensate for the 3 dB insertion loss of the 8-way Butler Matrix. By placing the multi-channel power amplifiers at the output of the beam forming matrix, it is possible to use amplifiers of lower power than would otherwise be necessary, thereby keeping power dissipation to acceptable levels.

Referring again to FIG. 9, in the best mode herein, preamplifiers 920–926 amplify the transmission signals prior to entering the beam forming matrix, to take account of the 3 dB loss incurred in the beam forming matrix 913. In the specific example shown, which is illustrated for a D-AMPS application, each pre-amplified low power transmission signal input into the beam forming matrix comprises three channels in a TDMA-3 three time slot configuration. A plurality of transmission channels are formed into four output signals from the beam forming matrix, which feed into the multi-channel power amplifiers 909–912. The output signals from the multi-channel power amplifiers are fed to the four individual elements of the antenna array 900, in order to produce a multi-beam radiation pattern output as illustrated in FIGS. 6, 7 or 8 herein each of the plurality of beams operating at a different respective carrier frequency, each carrier frequency carrying three separate channels. In the case of a seven beam radiation pattern there results a 21 channel output from the four element antenna array 900 and eight way beam forming Butler matrix 913.

However, referring again to FIG. 7 herein, in order to maintain downlink contact with a mobile station when passing between beams, the mobile station may be in contact with three, or in some cases four of the seven radiation beams. An example of such instances are illustrated in FIG. 7, where the mobile station is at position Y where the mobile may fall within the main beams of three of the seven radiation beams.

Figure 13:
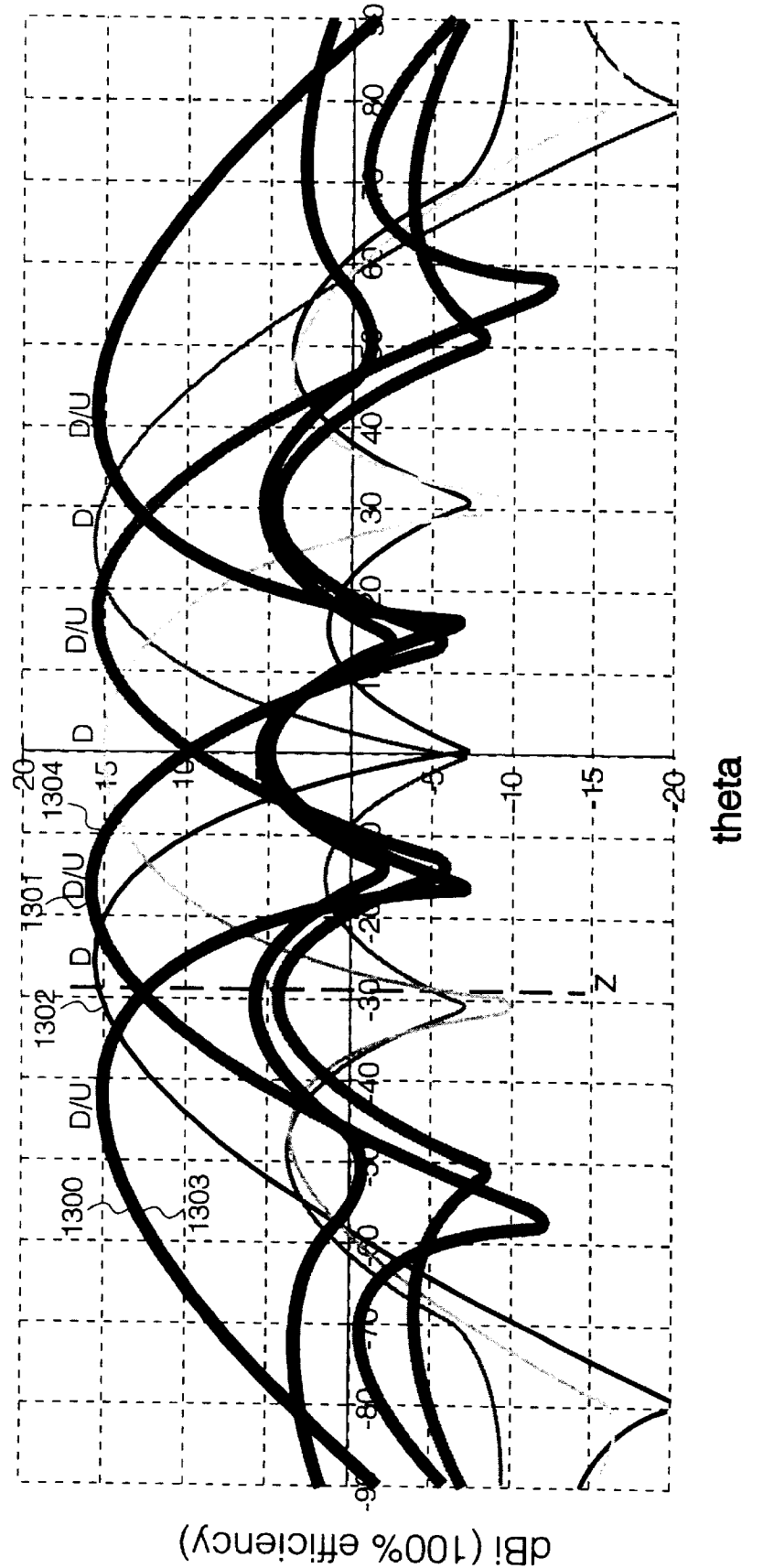
FIG. 13 illustrates an example beam pattern of seven non-orthogonal overlapping beams and four orthogonal uplink beams coinciding with alternate downlink beams.

Referring to FIG. 13 herein, there is shown an example of a beam pattern where there are seven non-orthogonal overlapping downlink radiating beams, and four orthogonal uplink beams. The uplink beams are areas in which the antenna has high sensitivity to received signals, as opposed to radiated beams. Alternate downlink radiated beams coincide spatially approximately with the uplink beams, which are sensitive to signals received from mobile stations. Dowlink beams in-fill the areas between adjacent orthogonal uplink beams. A signal from a mobile station spatially positioned at Z, approximately midway between adjacent uplink beams 1300–1301 will result in received signals on uplink beams 1300–1301 each of approximately equal strength. From the equal strength signals it may be determined that the mobile station is in a spatial azimuth region midway between uplink beams 1300, 1301. Downlink communications to the mobile station can then be assigned to be carried on downlink beam 1302 midway between downlink beams 1303, 1304 as being an optimum transmission beam. Two of the four orthogonal beams on the uplink may thereby be used to determine an optimum non-orthogonal in-fill beam for transmission on the downlink. Whether or not to communication on the downlink with the mobile station in the in-fill region, is determined from the relative strengths of the signals received from the mobile station on the two adjacent uplink beams 1300, 1301. If the signal strength from the mobile station received on each of the adjacent two uplink beams 1300, 1301 are within predetermined limits of each other, then the mobile station is communicated with on the corresponding downlink beam occupying the in-fill region between the adjacent uplink beams 1300, 1301.

When forming the non-orthogonal beams, in order to achieve the required level of side lobe suppression it is necessary that the signals output from the beam forming matrix arrive at the antenna and are transmitted to within a high degree of phase matching with each other. An accurate phase slope across the antenna elements must be maintained. The Butler Matrix has the advantage of producing a linear phase slope across the array, which is suitable for forming the non-orthogonal overlapped beams. However, the multi-channel power amplifiers, diplexors, cabling, and antenna array all introduce phase and amplitude variations which are device specific, arising from differences in manufacture between equivalent components. The errors introduced by such components are both amplitude dependent and temperature dependent. Overall, the necessary side lobe suppression of −10 dB below main lobe power, can be achieved with a compact antenna array provided the amplitude variation between the output of the beam forming matrix 913 and the antenna is maintained at a level typically no greater than 1.5 dB r.m.s., and the phase errors introduced by the components between the output of the beam forming matrix 913 and the antenna array 900 results in a deviation from a linear phase slope which is typically kept to within 10° r.m.s.

In the specific embodiment of the best mode herein, by using the commercially available MC180 Multi-Carrier Power Amplifiers from Spectrian, phase integrity across the plurality of power amplifiers 909, 912 can be adequately maintained. Phase integrity of these amplifiers is good, since in order to control the spurious free dynamic range of such amplifiers, a high degree of phase integrity is designed into the amplifier. The high degree of phase integrity is designed into the amplifier for a totally unconnected reason with the method of formation of heavily overlapped beams described herein, but the best mode herein takes advantage of this phase integrity for its implementation.

Dominant sources of amplitude variation are contributed by the power amplifiers 909–912, the beam forming matrix 913 and the antenna array 900. The phase adjusters introduce a significant amplitude error depending upon the phase setting which is required, however potentially this could be calibrated out by the amplitude adjusters, although since these could then subsequently introduce further phase errors dependent upon their settings, the calibration using such devices may then need to be iteratively achieved.

Phase tracking errors are predominantly due to the antenna array, beam forming matrix, and the diplexors. Phase errors due to cabling introduce a relatively small proportion of the overall phase tracking error.

Figure 14:
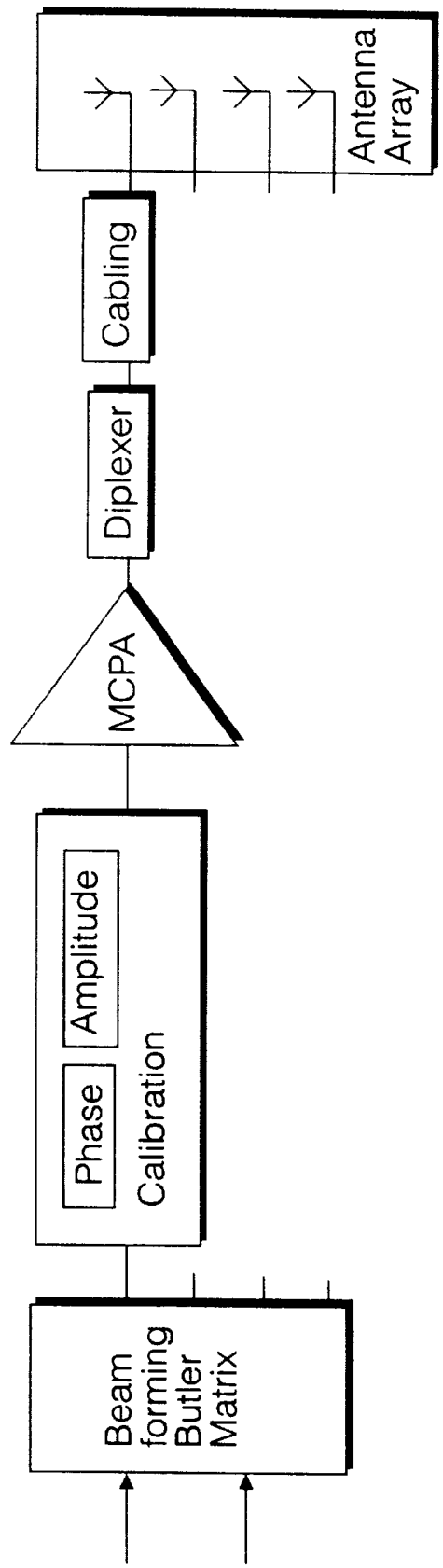
FIG. 14 illustrates schematically individual components of a single transmission signal path of the embodiment of FIG. 9.

Basic components comprising the specific embodiment of the best mode are described in FIG. 14 herein. A summary of approximate amplitude and phase tolerances attributable to the components as described in FIG. 14 herein and which will allow formulation of beams with acceptable side lobe levels are presented in table 1 as follows:

TABLE 1

| Component | Amplitude error (dB) | Phase error (°) |
| --- | --- | --- |
| Multi-carrier PA | ±1.0 (tracking) | ±1.0 |
| Diplexor | ±0.5 | ±3.0 |
| Butler Matrix | ±0.8 | ±5.5 |
| Antenna | ±1.0 | ±6.0 |
| Phase Adjusters (setting) | ±0.5 | ±1.3 |

The above tolerances are achievable using a Merrimac PSM-2C900-B phase trimmer, and Arra 2-4854-10 amplitude trimmer, a 30 Watt Spectrian MC180 multi-channel power amplifier, a Celwave PD5188-25 diplexor, Andrew 5M Heliax cabling, and a proprietary custom built 4×1 antenna array. Other phase and amplitude variations in the phase shifters, amplitude adjusters and cables may be neglected.

In a construction of the specific embodiment herein, a test antenna array with four horizontally spaced elements was built, with an element spacing of 0.175 meter, consistent with a half wavelength spacing at a frequency of 859 MHz, being a midpoint between downlink and uplink bands. The antenna was tested together with the aforementioned Butler matrix to demonstrate resultant beam patterns. For these tests, the phase adjusters were set such that the mid beam would be directed at Bore Sight. This was done by setting the phases of each channel to zero for a Butler matrix input on the mid beam, and consequently the directions of the other beams are shifted so that three beams lie either side of the mid beam.

Figure 15:
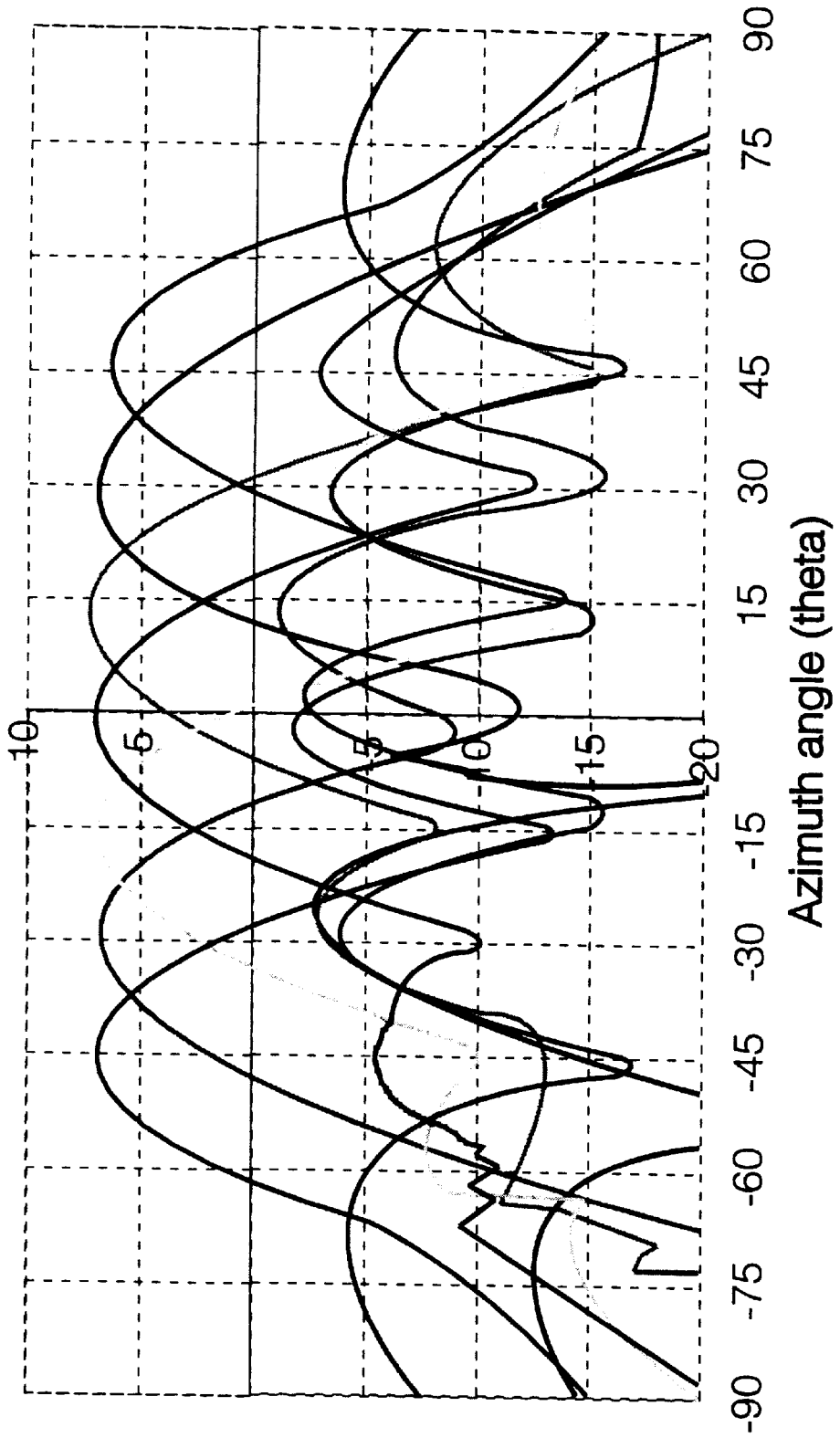
FIG. 15 illustrates an azimuth plot of a measured output of a construction of the specific embodiment of FIG. 9.

Experimentally, worst case side lobes varied from −11.1 dB in the center of the beam cluster down to about −8 dB for the outer beams. Main lobe beam gain varied across the beam pattern from a peak of 7.2 dBi (decibels relative to an isotropic radiator) on the mid beam, down to 6.2 dBi at the outer beams, a roll-off of 1 dB. An example of an antenna array beam pattern produced at a center beam carrier frequency 869 MHz is illustrated in FIG. 15 herein.

Phase integrity at the antenna elements may be maintained by automatically adjusting the phase adjusters and amplitude adjusters 927–934 to compensate for phase variations due to temperature effects.

Figure 16:
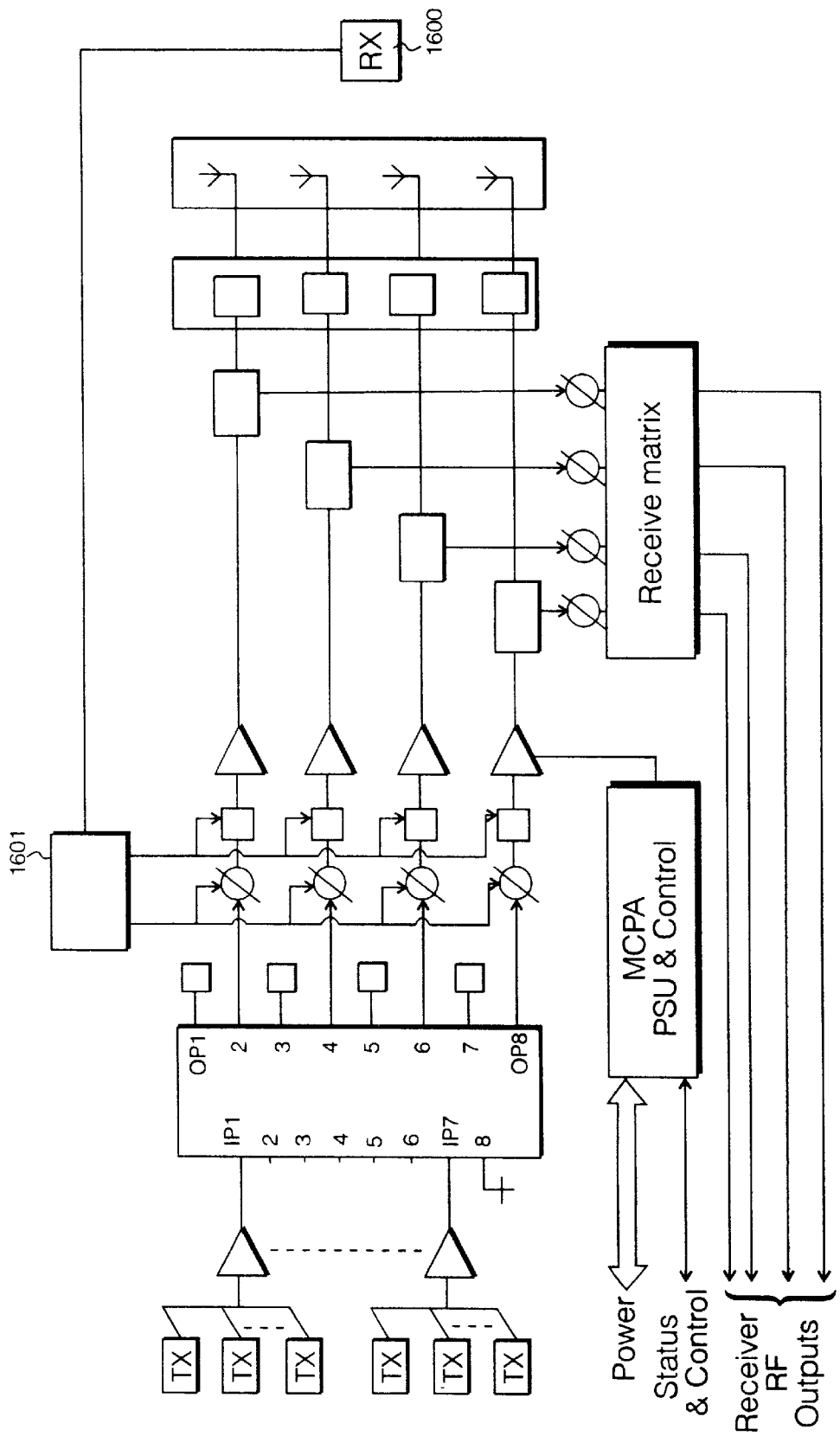
FIG. 16 illustrates a modification to the embodiment of FIG. 9 for automatically controlling integrity of the output radiation beam pattern.

In a modification of the best mode herein, as shown if FIG. 16, phase and amplitude can be corrected automatically by introducing a near field probe receiver 1600 or set of near field receivers in the radiation beams produced by the antennas, to measure the relative phase and amplitude of signals transmitted by the different elements of the antenna array. Information concerning phase and amplitude differences of the radiated beams may be fed back to a control unit 1601, which is preset to automatically adjust phase and amplitude to maintain uniformity of phase slope across the antenna beams, and uniformity of signal strength of the radiated beams at the antennas.

Although in the best mode herein, an antenna arrangement has been described using a Butler Matrix as a beamformer, in the general case beamforming can be implemented at a variety of points between the antenna elements and transceivers. For example, the beamforming may be implemented digitally at low frequencies, e.g. 30 kHz baseband, at intermediate frequency, or at radio frequency e.g. 850–900 MHz, 1800 MHz or 1900 MHz.

REFERENCES

[1] "A Spectrum Efficient Cellular Base Station Antenna Architecture", S C Swales and M A Beach, Personal and Mobile Radio Communications Conference, Warwick, United Kingdom 1991.

[2] "Proposed Advanced Base Station Antennas for Future Cellular Mobile Radio Systems", W S Davies, R J Long and E Vinnal, Australian Telecoms Research, Vol 22, No. 1, pp 53–60(1988).

[3] "Introduction to Antennas", Martin S Smith, Published by MacMillan, 1988, Chapter 6.

| Abbreviations | |
|---|---|
| BSS | Base Station System |
| BTS | Base Transceiver Station |
| C/I | Carrier to Interference Ratio |
| CDMA | Code Division Multiple Access |
| FFT | Fast Fourier Transform |
| GSM | Groupe Systeme Mobile |
| ISDN | Integrated Services Digital Network |
| MS | Mobile Station |
| MSC | Mobile Switching Center |
| NMC | Network Management Center |
| OMC | Operations and Maintenance Center |
| PSTN | Public Switched Telephone Network |
| TDMA | Time Division Multiple Access |

What is claimed is:

1. An antenna arrangement for a cellular wireless communication system, said arrangement comprising:

an antenna array for forming a multiplicity of separate overlapping radio frequency radiation beams, said array having a plurality of individual radiating antenna elements each having a wide angle coverage;

a beam forming means producing a beam formed output signal, each said beam comprising a number of separate channels; and a plurality of power amplifiers positioned between said beam forming means and said antenna array, each said power amplifier receiving an input from said beam forming means.

2. An antenna arrangement as claimed in claim 1, wherein said antenna array comprises a plurality of individual radiating antenna elements in a single aperture.

3. An antenna arrangement as claimed in claim 2, wherein a separate said power amplifier is provided per each antenna element of said antenna array.

4. An antenna arrangement as claimed in claim 1, wherein said power amplifiers comprise multi-channel power amplifiers.

5. An antenna arrangement as claimed in claim 1, further comprising a plurality of phase calibration means arranged for phase calibration of signals at a position between said beam forming means and said antenna array.

6. An antenna arrangement as claimed in claim 4, comprising automated adjustment means for automatically controlling said phase calibration means.

7. An antenna arrangement as claimed in claim 1, further comprising a plurality of amplitude calibration means arranged for amplitude calibration of signals at a position between said beam forming means and said antenna array.

8. An antenna arrangement as claimed in claim 7, comprising automated adjustment means for automatically controlling said amplitude calibration means.

9. An antenna arrangement as claimed in claim 1, operable to produce a plurality of overlapping beams.

10. An antenna arrangement as claimed in claim 1, operable to produce a plurality of non-orthogonal beams.

11. An antenna arrangement as claimed in claim 1, wherein said beam forming means comprises a matrix having a first plurality of signal input ports and a second plurality of signal output ports, wherein a number of said output ports feeding signals to said power amplifiers is less than a number of said input ports.

12. An antenna arrangement as claimed in claim 1, wherein said antenna array; said plurality of radio frequency transceivers; said beam forming means; and said plurality of power amplifiers are selected such as to give a root mean square phase variation across said antenna array of within 20 degrees.

13. An antenna arrangement as claimed in claim 1, wherein said antenna array; said plurality of radio frequency transceivers; said beam forming matrix; and said plurality of power amplifiers are selected such as to obtain and amplitude variation of signals across said antenna array of within 3 dB.

14. A method of forming a multiplicity of overlapping beams using a multi-element antenna array, each said element having a wide angle coverage and each said beam comprising a number of separate channels, said method comprising the steps of:

inputting a first plurality of transmission signals into a beam forming means;

outputting a second plurality of transmission signals from said beam forming means;

inputting said second plurality of transmission signals to a plurality of power amplifiers;

amplifying said second plurality of transmission signals to produce a plurality of power amplified transmission signals; and energizing said antenna array with said power amplified transmission signals to produce said multiplicity of overlapping beams.

15. A method as claimed in claim 14, wherein said beams are non-orthogonal.

16. A method as claimed in claim 14, comprising the step of controlling a respective phase of each of said second plurality of transmission signals prior to said step of amplification.

17. A method as claimed in claim 14, comprising the step of controlling a respective amplitude of each of said second plurality of transmission signals prior to said step of amplification.

18. A method as claimed in claim 14, wherein said beams are spatially fixed beams.

19. A method according to claim 14, wherein each said antenna element receives a power amplified transmission signal of a corresponding respective said power amplifier.

20. A method as claimed in claim 14, wherein each of said second plurality of transmission signals comprises a plurality of individual communications channels.

21. A beam forming apparatus for a cellular wireless communications system, said apparatus being for forming a multiplicity of overlapping beams wherein each said beam comprises a number of separate channels, said apparatus comprising:

an antenna array comprising a plurality of antenna elements, each said element having a wide angle coverage;

a beam forming matrix having a first plurality of input ports each receiving a corresponding respective input transmission signal, a second plurality of output ports each outputting a corresponding respective output transmission signal; and a plurality of power amplifiers feeding said input transmission signals into said input ports, wherein each said power amplifier feeds a corresponding respective said input port, and each said output port feeds a corresponding antenna element, there being one said power amplifier per each said input port and one antenna element per each said output port, and said first plurality is greater than said second plurality.

22. In a cellular wireless communications apparatus, a method of communicating with a mobile station, said method comprising the steps of:

forming a plurality of directional wide angle coverage up-link beams, said up-link beams distinguishable from each-other in azimuth and each comprising a number of separate channels;

forming a plurality of directional down-link beams, said down-link beams distinguishable from each-other in azimuth, wherein a said down-link beam occupies an in-fill region in azimuth between adjacent first and second said up-link beams and individual ones of said plurality of down-link beams overlap-spatially regions occupied by individual ones of said up-link beams;

receiving from said mobile station first and second mobile signals on said respective first and second said up-link beams;

analyzing said first and second mobile signals received on said first and second up-link beams; and depending on a result of said analysis, communicating with said mobile station on said down-link beam occupying said in-fill region.

23. The method as claimed in claim 22, wherein said step of analyzing comprises:

comparing a strength of said first mobile signal with a strength of said second mobile signal.

24. The method as claimed in claim 22, wherein said plurality of up link beams comprise orthogonal beams.

25. The method as claimed in claim 22, wherein said plurality of downlink beams comprises non-orthogonal beams.

26. The method as claimed in claim 22, wherein individual ones of said plurality of downlink beams occupy in-fill regions between adjacent ones of said plurality of up link beams.

27. The method as claimed in claim 22, wherein individual ones of said plurality of downlink beams overlap spatially regions occupied by individual ones of said up link beams.

28. An antenna arrangement as claimed in claim 1, wherein said wide-angle coverage covers a 120° sector of a cell and each said beam extends over an area of at least 17° at its nominal −1 dB contour.

29. An antenna arrangement as claimed in claim 1, wherein said input comprises a number of channels in a TDMA time-slot configuration.

30. The method as claimed in claim 14, wherein said wide angle coverage covers a 120° sector of a cell and each said beam extends over an arc of at least 17° at its nominal −1 dB contour.

31. A beam forming apparatus as claimed in claim 21, wherein said wide angle coverage covers a 120° sector of a cell and each said beam extends over an arc of at least 17° at its nominal −1 dB contour.

32. A method as claimed in claim 22, wherein said wide angle coverage covers a 120° sector of a cell and each said beam extends over an arc of at least 17° at its nominal −1 dB contour.

* * * * *